3,232,881
METHOD FOR REMOVING CURED AMIDE INTERPOLYMER RESINS
Erwin J. Kapalko, Muskego, Wis., and James B. Lear, Pittsburgh, Pa., assignors to Pittsburgh Plate Glass Company, Pittsburgh, Pa., a corporation of Pennsylvania
No Drawing. Filed May 11, 1962, Ser. No. 194,155
8 Claims. (Cl. 252—143)

This invention relates to stripping compositions for removing coating films from substrates and it has particular relation to stripping compositions which are particularly suitable for removing films of a coating composition containing a thermoset resin which is relatively difficult to remove from the substrate.

It has heretofore been disclosed to prepare valuable thermosetting resins which comprise interpolymers of an unsaturated carboxylic acid amide and at least one other monomer, the interpolymer being modified by reaction with an aldehyde or an aldehyde and an alcohol. The resultant interpolymers may be represented by the formula:

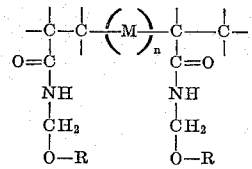

wherein M represents a unit of monomer polymerized with the amide to give long chain molecules, and $n$ represents a whole number greater than 1. R is either hydrogen or alkyl as, for example, ethyl, methyl or butyl, representing the hydrocarbon portions of a lower aliphatic alcohol. These materials are soluble in aromatic hydrocarbon solvents and solutions thereof may be applied as films to various substrates and cured to a hard, thermoset, durable state. Numerous compositions of this family and modifications thereof with various added resins, such as nitrocellulose, epoxy resins, and the like, are disclosed in United States Patents Nos. 2,870,116, 2,870,117, 2,919,254, 2,940,943, 2,940,944, 2,940,945, 2,978,437 and 3,011,993.

The resultant films are of excellent characteristics with respect to gloss, resistance to staining and the action of solvents and other agencies of degradation. This latter characteristic, of course, is highly desirable during the service of the thermoset films, but poses problems when it becomes necessary to strip the cured and thermoset material from a substrate, simply because the films resist the action of most of the available stripping agents. Particular difficulty is encountered in connection with the apparatus which is employed in spraying or otherwise coating various articles, such as household utensils and furniture or automobile parts, with the materials. The hooks or clamps and other portions of conveyor chains employed in spraying and curing the films upon the articles often become coated with the material and the coats set up and cure to a hard, highly resistant state wherein they cannot be removed by ordinary paint stripping materials, or at best, can be stripped only after long and tedious application of the stripping material.

This invention comprises a stripping material for coatings upon various substrates and particularly for coatings of the foregoing modified amide interpolymer resins, which stripping material effectively loosens the films within a comparatively few minutes, even at room temperature, so that they can be removed from the substrate by merely washing with water, or by other simple and inexpensive means. The stripping compositions of this invention comprise as a main or active ingredient a halogenated aliphatic carboxylic acid wherein halogen replaces one or more hydrogen atoms in the aliphatic group, which acid is incorporated with certain added ingredients in a stripping solution as hereinafter disclosed, in order to improve the effect thereof. For example, the acid is incorporated in an appropriate inert organic solvent which is not substantially attacked by the acid.

Another feature of the invention comprises the incorporation of a water-soluble alcohol into the foregoing composition.

Still another feature comprises the incorporation into said composition of a wetting agent, preferably one which is anionic or cationic and which is effective even in the presence of strong acids, such as the halogenated aliphatic carboxylic acids.

The stripping composition preferably also includes water. The latter preferably is added in an amount in excess of that which can be carried into the solution of halogenated acid and the carrier solvent by the added alcohol and/or the wetting agent. As a result, some of the water provides a separate stratum or layer, which because of its lower density, lies upon the surface of the higher density active mixture containing most of the organic halogenated solvent and the halogenated aliphatic carboxylic acid. It therefore tends to prevent volatilization and loss of solvent. Contamination of the atmosphere by the solvent and/or the acid is consequently reduced. It will also be apparent that the water effectively ionizes the strong halogenated carboxylic acid at the interface between the two layers, thus increasing its potency as a stripping agent.

The alcohol, as previously indicated, probably also dissolves some of the water which is charged with ionized acid and carries the same into the solution where, while in ionized state, it is effectively caused to contact with the surface to be stripped. Contact of the ionized acid with the film undoubtedly is materially promoted by reason of the presence of the wetting agent.

Strong halogenated aliphatic carboxylic acids which may be used in the formation of stripping compositions in accordance with the provisions of this invention comprise monochloroacetic acid, dichloroacetic acid and trichloroacetic acid. The corresponding fluoro and bromoacetic acids are included. Also, other halogenated acids, such as the halopropionic acids represented by alpha-chloropropionic acid, beta-chloropropionic acid, alpha,beta-dichloropropionic acid, alpha,beta-dibromopropionic acid, beta-bromopropionic acid, and the like, may be employed. The halogenated acids which are useful in the practice of this invention usually are of relatively low ionization constant as, for example, of an ionization constant in a range of about $1.38 \times 10^{-3}$ to about $2 \times 10^{-1}$.

The solvents wherein the foregoing halogenated aliphatic carboxylic acids are incorporated are usually relatively nonreactive halogenated hydrocarbons, such as are represented by the group consisting of chloromethylene, trichloroethylene, perchloroethylene, carbon tetrachloride, methyl chloroform, 1,2-ethylene dichloride, ethylidene chloride, chloroform, trichloroethane, 1,1,2,2-tetrachloroethane, trifluoroethane, which have a strong solvent effect. Sometimes, dioxane or isophorone may also be used separately or in conjunction with one or more of the foregoing halogenated hydrocarbons.

Alcohols which may be employed in combination with the foregoing solution of solvent and halogenated aliphatic carboxylic acids comprise lower water-soluble monohydric alcohols, such as methyl alcohol, ethyl alcohol, propyl alcohol and isopropyl alcohol. These alcohols are characterized by solubility both in the water and in many of the halogenated hydrocarbon solvent systems, and will therefore assist in contacting the water and also the halogenated aliphatic carboxylic acid with the surface of the coating material which is to be stripped from the substrate. The alcohol also doubtless acts as a wetting agent which promotes contact of the active ingredients with the film to be stripped.

In order further to effect thorough wetting of the latter surface, an acid-resistant emulsifying agent is often included in the mixture, but is optional. Useful emulsifiers comprise anionic emulsifiers, such as Nekal BA–75 which has heretofore been used as a water-soluble textile processing agent. It is a sodium alkyl naphthylene sulfonate and is relatively resistant to strong acids, such as trichloroacetic acid.

Another very effective emulsifying agent for use in the system is sold commercially under the trade name of Petrowet WN, which is also resistant to the acids above enumerated and has good emulsifying or wetting characteristics and penetration with respect to the films to be stripped. The Petrowet WN is an anionic sodium alkyl sulfate. Obviously, the action of the wetting agent is essentially physical rather than chemical and it will be apparent that others of the numerous commercially recognized emulsifying or wetting agents which are reasonably resistant to the action of acids may be substituted therefor. Many of the more common of these are anionic sulfonates of various organic materials. However, it will be recognized that cationic materials which are wetting agents may also be used in a like capacity. Added examples of wetting agents comprise:

Ammonyx T, which is cetyl dimethyl benzyl ammonium chloride
Arkolene GN, which is an ammonium alkyl aryl sulfonate
Carbanone A, which is a carbonylated polyoxy derivative
Calanac SN, which is stearamidomethyl-B-hydroxyethyl ammonium nitrate
Celopon, which is sodium oleyl methyl taurate
Fixanol VR, which is cetyl pyridinium bromide
Leyco Ampholite-335, which is a fatty betaine As stated, the emulsifying agent may be eliminated and the mixture will still produce a stripping effect.

The following example is illustrative of a composition comprising halogenated trichloroacetate acid, a chlorinated solvent, an alcohol and a wetting agent, which may be used in the practice of this invention.

| | Pounds |
|---|---|
| Methylene chloride | 815 |
| Ethyl alcohol | 135 |
| Trichloroacetic acid | 53 |
| Petrowet WN | 9 |

It will be recognized that in this formulation the other halogenated solvents herein disclosed may be substituted for the methylene chloride; the ethyl alcohol may be replaced by other alcohols as herein disclosed; the trichloroacetic acid may be replaced by monochloroacetic acid or dichloroacetic acid, or the corresponding bromoacetic acids; the Petrowet WN may be replaced by Nekal BA–75 or various of the other wetting agents herein disclosed or quivalents thereof. The particular system as above illustrated is considered to be highly efficient.

Considerable variation of the proportions of the several ingredients as disclosed in the above formula is contemplated. For example, the composition may comprise:

| | Parts by weight based upon the mixture |
|---|---|
| Solvent | 40–95 |
| Halogenocarboxylic acid | 1–40 |
| Alcohol (lower monocarboxylic water-soluble) | [1] 0–40 |
| Surfactant | [1] 0–10 |

[1] Preferably at least 1 percent by weight.

While sometimes either the alcohol or the surfactant may be dispensed with, it is usually preferred to include at least one of these for purposes of increasing the wetting characteristics of the stripping material with respect to the films to be stripped. Usually, there will be at least 1 percent of either the alcohol or the surfactant and most commonly, a total of 5 percent or more of both are present. Water to provide an aqueous layer is added. Ordinarily, about 3 to about 100 percent by weight based upon the mixture of water may be so used.

For purposes of showing the efficiency of the improved stripping systems, test panels were coated with an interpolymer of an acrylamide-monomer mixture, which interpolymer had been modified with formaldehyde and butanol in accordance with the provisions of the previously mentioned patents. Examples illustrating the coatings and the stripping thereof are as follows:

*Example I*

In preparing the coatings for the panels upon which the stripping solutions of this invention were tested, an interpolymer resin was prepared in which the components were:

| | Percent by weight |
|---|---|
| Acrylic acid | 5 |
| Styrene | 90–80 |
| Acrylamide | 10 |
| Epon 1001 | 10 |

The mixture was polymerized and condensed with an equivalency based upon the acrylamide, of formaldehyde in butyl alcohol in accordance with the disclosure of United States Patent No. 2,870,117, and was finally made up into a solution of 50 percent resin solids content in a mixture of 45 percent butanol and 55 percent toluene. This solution is herein termed "Resin A" solution.

The solution was used to form a pigmented paste designated as "B" and comprising:

| | Grams |
|---|---|
| Resin A solution | 5,440 |
| Xylene (solvent) | 3,000 |
| $TiO_2$ | 15,000 |

The pigmented paste was further blended with added resin, pine oil and xylene to provide a coating composition, termed "C," comprising:

| | Parts by weight |
|---|---|
| Paste (as above described) | 469 |
| Resin A solution | 506 |
| Silicone oil (Linde R–12) 2 percent in xylol | 2 |
| Pine oil | 10 |
| Xylene | 150 |

Composition C was sprayed upon test panels of steel and the resultant films were baked to a hard, adherent state. Such films are strongly resistant to most stripping agents.

These coated panels were used as standards to determine the efficacy of the stripping solutions of this invention. The compositions of the solutions and the time of immersion in minutes required for loosening of the films to the extent that they can be washed off by a water spray, are tabulated as follows:

| Stripping solution No. | I | II | III |
|---|---|---|---|
| Dichloromethane (percent) | 75 | 75 | 75 |
| Ethyl alcohol (percent) | 25 | 25 | 25 |
| Water (percent) | 5 | 5 | 5 |
| Acetic acid (percent) | 5 | 0 | 0 |
| Monochloroacetic acid (percent) | 0 | 5 | 0 |
| Dichloroacetic acid (percent) | 0 | 0 | 5 |
| Stripping time (minutes) without surfactant | (1) | 120 | 45–60 |
| Stripping time (minutes) with 3.7 percent of Petrowet WN | (2) | 45 | 15 |

[1] Did not strip. [2] Not tested.

The addition of surfactant greatly speeded stripping. The films could be washed off the panels by a water spray or jet.

*Example II*

In this example, trichloroacetic acid was employed as the halogenated acid component of the stripping solution.

The monomer of the resin in the films used as a standard for stripping comprised:

| | | |
|---|---|---|
| Styrene | pounds | 16.6 |
| Acrylic acid | grams | 186.0 |
| Acrylamide | pounds | 3.0 |

To the monomer were added:

| | | |
|---|---|---|
| Butyl formcel | pounds | 6.34 |
| Butyl alcohol | do | 20.00 |
| Maleic anhydride | grams | 36.00 |
| Epon 1001 | pounds | 2.20 |

The mixture was reacted in accordance with United States Patent No. 2,870,117 to provide a resin solution from which 11 pounds of butyl alcohol was stripped and 12 pounds of xylene was added.

The solution was of a resin solids content of 48 percent by weight and a viscosity of T–V.

A pigment paste was made from a part of this resin solution and comprising:

| | Grams |
|---|---|
| Resin solution | 5,140 |
| Xylene | 3,000 |
| TiO$_2$ | 15,000 |

The paste was formulated into a finish coating composition comprising:

| | Parts by weight |
|---|---|
| Pigment paste | 479 |
| Added resin solution | 563 |
| Silicone oil (Linde R–12) 2 percent solution in xylol | 2 |
| Pine oil | 10 |
| Xylene | 86 |
| Phosphoric acid (curing catalyst) | 2 |

Test panels of steel were sprayed with this coating composition and were cured at about 300° F. for 30 minutes. The cured films were stripped with solutions of:

| | Parts by weight |
|---|---|
| Dichloromethane | 75 |
| Ethyl alcohol | 21 |
| Trichloroacetic acid | 4 |

Enough water to provide an aqueous layer was added and the panels were immersed in the system.

Films were stripped from the panels by the system, with and without surfactant (Petrowet WN). The stripping times are tabulated as follows:

| | Minutes |
|---|---|
| Without surfactant | 25–30 |
| With surfactant | 15 |

The stripping solution without surfactant was useful, but was materially improved when surfactant was added.

*Example III*

A coating composition which was the same as C in Example I was used in this example as a standard to test the stripping solution.

Some test panels of steel were directly coated with the material, while other like panels were first prime coated with a composition comprising a total of:

| | Parts by weight |
|---|---|
| Heat-reactive urea-formaldehyde resin | 80 |
| Phenol-formaldehyde resin | 40 |
| Acetate of monoethyl ether of glycol (solvent) | 60 |
| Epoxy resin solution (40 percent) | 435 |
| Aromatic solvent | 8 |
| Bentone gel | 30 |
| Diacetone alcohol | 75 |
| Pigments (essentially equal parts of TiO$_2$ and lithopone) | 326 |
| Catalyst (sodium salt of p-toluene sulfonic acid) | 1 |

This primer is a good one, but could be replaced by others containing the same or other resin solids. The other ingredients, including the bentone gel which is used merely to promote thickening, may be replaced or eliminated.

The steel panels having the coating of the primer were coated with the coating composition C of Example I to provide a resistant finish. Other panels without primer were coated with the same finishing material. The several panels were cured by baking at 300° F. for 30 minutes.

These panels were used as standards to test the merits of the stripping materials. In the tests, a stripping solution was made up comprising:

| | Parts by weight |
|---|---|
| Dichloromethane | 817 |
| Ethyl alcohol | 135 |
| Trichloroacetic acid | 53 |

The stripping solution was divided into three parts and to each part was added water to provide an aqueous surface layer.

One part, designated as "AIII," was used for stripping without added surfactant.

To a second part, designated as "BIII," was added about 2 grams of surfactant (Petrowet WN).

To a third part, designated as "CIII," was added in like ratio a different surfactant (Tergitol P–26).

Both primed and unprimed panels were submerged in the solutions under the aqueous surface layer and the times in minutes required to loosen the films so that they could be washed off with a water spray was determined. These times are as follows:

| Stripping solution | Unprimed panel, minutes | Primed panel, minutes |
|---|---|---|
| AIII | 20–25 | 30–35 |
| BIII | 15 | 20–25 |
| CIII | 15 | 20–25 |

The solution AIII without surfactant would strip the films from primed and unprimed panels and its use without added surfactant is included as a part of this invention. However, in each instance, the stripping time was materially improved when a surfactant was added.

Other surfactants than those herein disclosed could be used in the stripping solution. Ethyl alcohol could be replaced by other lower water-soluble alcohols, such as methyl alcohol, propyl alcohol, isopropyl alcohol, butyl alcohol, and isobutyl alcohol. Mixtures of alcohols may be used.

Other additives and adjuvants than the main ingredients as herein disclosed may be included in the stripping solution.

Of the several systems employed, the trichloroacetic acid, especially when incorporated in a solution containing the wetting agent, was substantially superior to any of the others.

It will be appreciated that the stripping systems as herein disclosed are especially desirable for use to strip such highly resistant coatings as the aldehyde-modified amide-monomer interpolymers, such as those of the aforementioned patents, because of the resistance of the latter to most stripping systems. However, it will be apparent that the systems may also be used with various other coatings; examples of such other coatings include the so-called epoxy resins such as may be employed as primers for the interpolymer resins. The systems comprising methylene chloride, chloroacetic acids, alcohols and emulsifiers, when covered with a layer of water, have been found very rapidly to strip epoxy resin coatings, for example, within a period of 5 or 10 minutes. It is thus apparent that in certain respects, the interpolymer resins of amide and added monomer, when modified with an aldehyde, are even more resistant to solvents than are the common epoxy resins.

While specific examples of the invention have been set forth hereinabove, it is not intended to limit the invention solely thereto, but to include all of the variations and modifications falling within the scope of the appended claims.

We claim:

1. A method of removing from a substrate a cured, adherent film of an aldehyde-modified interpolymer of an unsaturated carboxylic acid amide and at least one other ethylenically unsaturated comonomer, said method comprising applying to said film a mixture of (1) from about 40 to about 95 percent by weight of a liquid halogenated aliphatic hydrocarbon solvent, (2) from about 1 to about 40 percent by weight of a halogenated aliphatic monocarboxylic acid having 2 to 3 carbon atoms and 1 to 3 halogen atoms and an ionization constant between about $1.38 \times 10^{-3}$ and about $2 \times 10^{-1}$, (3) from about 1 to about 40 percent by weight of a water-soluble aliphatic monohydric alcohol having 1 to 4 carbon atoms, and (4) from about 1 to about 10 percent by weight of an acid resistant surface active agent.

2. The method of claim 1 in which said mixture includes water in an amount sufficient to form a separate layer.

3. The method of claim 1 in which said halogenated carboxylic acid is a chloroacetic acid.

4. The method of claim 1 in which the total amount of said alcohol and said surface active agent is at least 5 percent by weight based on the total mixture.

5. A method of removing from a substrate a cured, adherent film of an aldehyde-modified interpolymer of an unsaturated carboxylic acid amide and at least one other ethylenically unsaturated comonomer, said method comprising applying to said film a composition consisting essentially of (1) from about 40 to about 95 percent by weight of dichloromethane, (2) from about 1 to about 40 percent by weight of a chloroacetic acid, (3) from about 1 to about 40 percent by weight of a water-soluble aliphatic monohydric alcohol having 1 to 4 carbon atoms, and (4) from about 1 to about 10 percent by weight of an acid resistant surface active agent.

6. The method of claim 5 in which said chloroacetic acid is trichloroacetic acid.

7. A method of removing from a substrate a cured, adherent film of an aldehyde-modified interpolymer of an unsaturated carboxylic acid amide and at least one other ethylenically unsaturated comonomer, said method comprising immersing said film in a stripping solution until the film is loosened and then washing away the loosened film with a water spray, said stripping solution being a mixture of (1) from about 40 to about 95 percent by weight of a liquid halogenated aliphatic hydrocarbon solvent, (2) from about 1 to about 40 percent by weight of a halogenated aliphatic monocarboxylic acid having 2 to 3 carbon atoms and 1 to 3 halogen atoms and an ionization constant between about $1.38 \times 10^{-3}$ and about $2 \times 10^{-1}$, (3) from about 1 to about 40 percent by weight of a water-soluble aliphatic monohydric alcohol having 1 to 4 carbon atoms, and (4) from about 1 to about 10 percent by weight of an acid resistant surface active agent.

8. The method of claim 7 in which the time of immersion is from about 15 to about 30 minutes.

References Cited by the Examiner

UNITED STATES PATENTS

| | | | |
|---|---|---|---|
| 1,742,347 | 1/1930 | Fries | 252—143 |
| 2,969,328 | 1/1961 | Ellenson et al. | 252—153 |
| 3,072,579 | 1/1963 | Newman | 252—143 |
| 3,138,557 | 6/1964 | Arden et al. | 252—186 |

JULIUS GREENWALD, *Primary Examiner.*